(12) United States Patent
Ishidoshiro (10) Patent No.: US 7,822,441 B2
(45) Date of Patent: Oct. 26, 2010

(54) ACCESS POINT (75) Inventor: Takashi Ishidoshiro, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 306 days.

(21) Appl. No.: 10/550,300

(22) PCT Filed: Mar. 24, 2004

(86) PCT No.: PCT/JP2004/004100

§ 371 (c)(1),
(2), (4) Date: Sep. 20, 2005

(87) PCT Pub. No.: WO2004/086640

PCT Pub. Date: Oct. 7, 2004

(65) Prior Publication Data

US 2006/0217134 A1 Sep. 28, 2006

(30) Foreign Application Priority Data

Mar. 25, 2003 (JP) .............................. 2003-082162

(51) Int. Cl.
*H04M 1/00* (2006.01)
(52) U.S. Cl. .................... 455/562.1; 455/504; 455/505; 455/506; 455/507; 455/272; 455/13.3; 455/575.7; 455/33.3
(58) Field of Classification Search ................. 455/561, 455/562.1, 272, 561.2, 504–507, 13.3, 575.7, 455/33.3
See application file for complete search history.

(56) References Cited

U.S. PATENT DOCUMENTS 5,832,389 A * 11/1998 Dent ........................ 455/562.1

(Continued)

FOREIGN PATENT DOCUMENTS

EP          1 119 115 A1       7/2001

(Continued)

OTHER PUBLICATIONS

International Search Report dated Jul. 13, 2004 from corresponding International Application No. PCT/JP2004/004100.

(Continued)

*Primary Examiner*—Lester Kincaid
*Assistant Examiner*—Mehmood B Khan
(74) *Attorney, Agent, or Firm*—Beyer Law Group LLP (57) ABSTRACT

An access point 10 providing a wireless LAN connection to a terminal device, for the purpose of connecting the terminal device to a WAN, the access point 10 includes: antenna units 210 and 310*a-d* that send and/or receive a radio frequency signal used for exchanging information via the wireless LAN; signal conversion units 220, 230, 240, 320*a-d,* 330*a-d* and 340*a-d* that perform conversion between the radio frequency signal and a digital signal as the information; an information processing unit 110 that executes processing of the digital signal based on a communication protocol for exchanging of the information; antenna cases 200 and 300*a-d* that contain the antenna units and the signal conversion units; a main unit case 100 that, separated from the antenna cases, contains the information processing unit; and a wired cables 250 and 350*a-d* that, connecting the antenna cases and the main unit case, performs transmission the digital signal between the signal conversion units and the information processing unit.

7 Claims, 3 Drawing Sheets

U.S. PATENT DOCUMENTS

| | | | | |
|---|---|---|---|---|
| 5,903,834 | A | * | 5/1999 | Wallstedt et al. ......... 455/422.1 |
| 6,397,067 | B1 | | 5/2002 | Tanaka et al. |
| 2003/0185287 | A1 | * | 10/2003 | Ogawa ....................... 375/211 |
| 2004/0102198 | A1 | * | 5/2004 | Diener et al. ............ 455/456.1 |

FOREIGN PATENT DOCUMENTS

| | | |
|---|---|---|
| JP | 11-284998 | 10/1999 |
| JP | 11-514513 | 12/1999 |
| JP | 2001-24576 | 1/2001 |
| JP | 2002-124889 | 4/2002 |
| JP | 2002-290258 | 10/2002 |
| JP | 2002-325050 | 11/2002 |
| JP | 2002-354534 | 12/2002 |
| KR | 1999-0031807 | 5/1999 |
| WO | WO 94/28690 | 12/1994 |
| WO | WO 97/13386 | 4/1997 |
| WO | WO 01/05065 A1 | 1/2001 |
| WO | WO 02/30022 A2 | 4/2002 |

OTHER PUBLICATIONS

Hossein Izadpanah, "A Millimeter-Wave Broadband Wireless Access Technology Demonstrator for the Next-Generation Internet Network Reach Extension," IEEE Communications Magazine, Issue 9, vol. 39, Sep. 2001, pp. 140-145.

Supplementary European Search Report dated Oct. 24, 2008 for European Application No. 04723070.1.

* cited by examiner

ACCESS POINT

BACKGROUND

1. Technical Field

The present invention relates to an access point of a wireless local area network, and more specifically relates to a separate type access point formed by a device main unit and an antenna unit using separate cases.

2. Related Art

A wireless local area network (hereafter called a wireless LAN) is composed from an access point that is a base station that is the center of the wireless LAN and a terminal device that is a sub-station, and performs the communication required between the devices that form the wireless LAN. As these access points, there are separate type access points formed by a device main unit and an antenna unit using separate cases. An electrical connection is made between the device main unit and the antenna unit using a wired cable. With this wired cable, sent signals and received signals are transmitted between the device main unit and the antenna unit. The separate type access point is used in locations for controlling a wireless LAN, in cases when there is a far distance with the location for providing this wireless LAN, and the like. For example, to provide a wireless LAN to an outdoor terminal device, this separate type access point is widely used when the device main unit is installed indoors and the antenna unit is installed outdoors.

Generally, electrical signals transmitted using wired cables undergo insertion loss, and the signal level is attenuated. This insertion loss increases relative to the cable length. For separate type access points as well, when the wired cable for connecting the device main unit and the antenna unit is made longer, the insertion loss increases. This increase in insertion loss is linked to a rise in the rate of data sending and receiving errors between wireless LAN devices, and there were cases when it worsened the communication quality of wireless LAN communication.

In the past, to suppress worsening of communication quality due to wired cable insertion loss, there were access points equipped with optical cables called optical fibers for the wired cable. This access point connected the device main unit and the antenna unit by an optical fiber with low insertion loss, and performed transmission of radio frequency (hereafter RF) signals via this optical fiber. By doing this, it is possible to reduce the insertion loss for the wired cable. Also proposed is an access point for which the device main unit is equipped with an amplifier for power amplifying the sent signals. This access point power amplifies the sent RF signals transmitted by the wired cable. By doing this, the sent signal insertion loss for the wired cable is supplemented. Similarly, to supplement the reduction of the received signal loss, access points are also known that are equipped with an amplifier for amplifying the received signals at the antenna unit. This access point power amplifies the received RF signal transmitted using the wired cable. By doing this, the insertion loss of the received signal with the wired cable is supplemented. As a result, these access points are able to increase the communication quality of wireless LAN communication.

As a reference for this part of the technology, there is JP-A-2002-325050. Noted in this reference is an access point for which the antenna unit is equipped with an amplifier for amplifying the received signals.

SUMMARY

However, these access points require optoelectronic conversion components, amplifiers, or the like, or electrical control of these is required, which as a result invites the problem of making the device constitution more complex, or the design more complex. Also, there is the problem of the manufacturing cost increasing due to such things as special cable such as optical fiber being required, the number of parts such as an amplifier increasing, and the man hours for assembly of these increasing.

An advantage of some aspects of the invention is to provide a separate type access point that is able to increase the communication quality of wireless LAN communication while trying to suppress an increase in complexity of the device constitution, or to suppress manufacturing costs.

A access point according to an aspect of the invention is an access point providing a wireless local area network connection to a terminal device, for the purpose of connecting the terminal device to a wide area network, the access point comprising: an antenna unit that sends and/or receives a radio frequency signal used for exchanging information via the wireless local area network; a signal conversion unit that performs conversion between the radio frequency signal and a digital signal as the information; an information processing unit that executes processing of the digital signal based on a communication protocol for exchanging of the information; an antenna case that contains the antenna unit and the signal conversion unit; a main unit case that, separated from the antenna case, contains the information processing unit; and a wired cable that, connecting the antenna case and the main unit case, performs transmission the digital signal between the signal conversion unit and the information processing unit.

According to this access point, the exchange of signals at the wired cable between the device main unit and the antenna unit can be performed using a digital transmission method. Generally, the digital transmission method replays and transmits pulses for which the amplitude has been decreased by insertion loss only by the pulse time position and the presence or absence of the pulse, so it is possible to suppress the degradation of signal quality more than with the analog transmission method. As a result, it is possible to suppress a rise in the rate of data sending and receiving errors between wireless LAN devices. Furthermore, this access point is able to transmit digital signals handled based on a wireless LAN communication protocol (e.g. IEEE 802.11 or the like) using a wired cable. The wireless LAN devices are standard equipped with hardware for performing conversion and the like of analog signal and digital signals and the like to execute processing based on the wireless LAN devices. As a result, it is not necessary to separately provide hardware for performing conversion of analog signals and digital signals and the like in order to perform digital transmission using a wired cable. Therefore, it is possible to increase the communication quality of wireless LAN communication while attempting to suppress an increase in complexity of the device constitution or to suppress the manufacturing cost.

The access point of the invention having the constitution noted above may also use the following aspects. In accordance with an embodiment of the invention, the signal conversion unit may include: a frequency conversion unit that performs conversion between the radio frequency signal and an intermediate frequency signal having lower frequency than the radio frequency signal; a modem unit that performs modulation and/or demodulation between the intermediate frequency signal and a base band signal; and a base band unit that performs conversion between the base band signal and the digital signal.

In accordance with an embodiment of the invention, the transmission of the digital signal by the wired cable may be either one of serial transmission and parallel transmission. With parallel transmission, it is possible to transmit digital signals in a group using a plurality of lines. By doing this, it is possible to increase the transmission speed of digital signals with a wired cable. Meanwhile, with serial transmission, it is possible to transmit digital signals using one line. By doing this, skew does not occur in the signals between data lines, so it is possible to have more distance between the device main unit and the antenna unit than in the case of parallel transmission.

In accordance with an embodiment of the invention, the wired cable, in addition to transmission of the digital signal, may perform at least one of transmission of a control signal and power supply, for at least one of the antenna unit and the signal conversion unit. By doing this, it is possible to connect with one set of wired cables between the device main unit and the antenna unit. It is also not necessary to supply power separately to the antenna unit. As a result, it is possible to try to make the access point installation work and maintenance work easier.

In accordance with an embodiment of the invention, the wired cable may be coaxial cable. Coaxial cable has relatively strong resistance to noise, so it is possible to set the device main unit and the antenna unit at a distance. Also, because this is less expensive than optical cable, it is possible to suppress the manufacturing costs.

The aspects of the invention may also be referred to a method for exchanging signals at the access point. A method according to an aspect of the invention is a method for exchanging signals at an access point providing a wireless local area network connection to a terminal device, for the purpose of connecting the terminal device to a wide area network, the method comprising: disposing an information processing unit in a main unit case, wherein the information processing unit executes processing of a digital signal based on a communication protocol used by the wireless local area network; disposing a signal conversion unit in an antenna case separated from the main unit case, wherein the signal conversion unit performs conversion between the digital signal and a radio frequency signal which an antenna unit sends and/or receives over the wireless local area network; connecting the main unit case and the antenna case via a wired cable; and transmitting the digital signal according to the protocol of the local area network via the wired cable.

With this method, it is possible to perform the exchange of signals via the cable between the main unit case and the antenna case using digital signals according to the protocol of the local area network, to increase the S/N ratio of the exchange of signals via the cable, and to reduce the communication error rate.

DESCRIPTION OF EXEMPLARY EMBODIMENTS

In order to provide a clearer understanding of the constitution and advantages of the invention, an access point embodying the present invention is described below.

Figure 1:
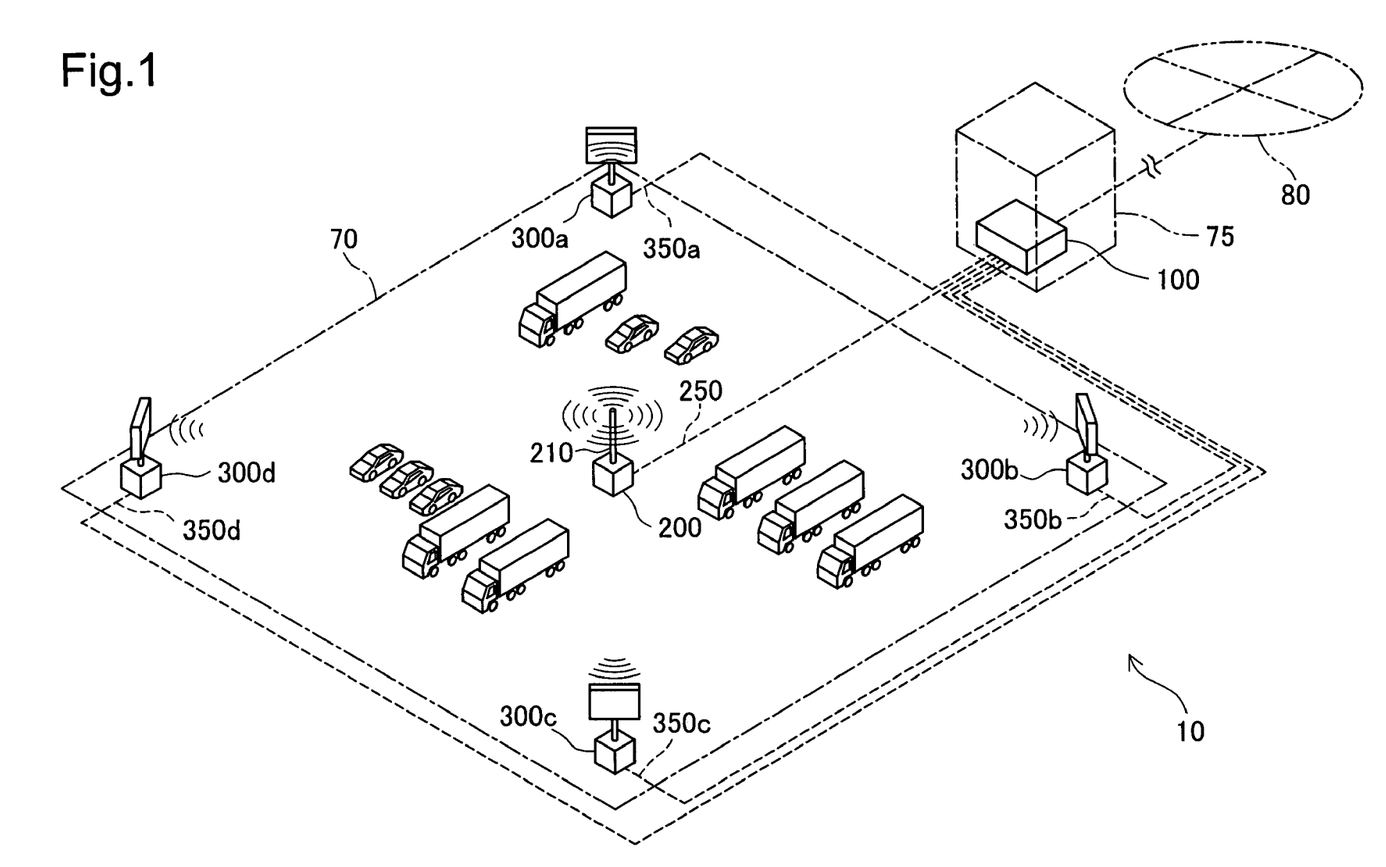
FIG. 1 is an explanatory diagram showing the overall schematic constitution of an access point 10 for the first embodiment.

First, the overall schematic constitution of the access point 10 for the first embodiment which is one aspect of the invention is described. FIG. 1 is an explanatory drawing showing the overall schematic constitution of the access point 10 of the first embodiment. The access point 10 provides a wireless LAN at a service area 70 such as for a freeway. In the service area 70, there are regions in which vehicles such as passenger cars, trucks, or the like park. The access point 10 provides the wireless LAN terminal devices built into or brought to vehicles parking in this region or to terminal devices within the service area 70 such as installed terminal devices. Specifically, this wireless LAN is constituted by the access point 10 and the terminal device within the service area 70, the access point 10 provides a wireless LAN connection environment to the terminal devices up to a specified number of units according to the connection capacity, and it is possible to provide various different services such as internet access and the like via the wireless LAN to the connected terminal devices. These wireless LAN devices are wireless LAN devices compliant with the IEEE 802.11b and/or 11g standards, which are wireless LAN standards.

The access point 10 is constituted by a main unit case 100 in which is housed a device for mainly performing information processing for the wireless LAN communication or the like, a sending antenna case 200 in which is housed a device for handling sent signals for the wireless LAN communication or the like, and four receiving antenna cases 300a, 300b, 300c, and 300d in which are housed devices for handling received signals for the wireless LAN communication. The main unit case 100 and the sending antenna case 200 are connected by the coaxial cable 250. The main unit case 100 and the receiving antenna cases 300a, 300b, 300c, and 300d are respectively connected by the coaxial cables 350a, 350b, 350c, and 350d.

Considering the ease of system maintenance and weather resistance, the main unit case 100 is installed indoors in the control tower 75 provided together in the service area 70. The sending antenna case 200 is installed near the center of the service area 70 to be able to send radio signals to terminal devices within the service area 70. The receiving antenna cases 300a, 300b, 300c, and 300d are installed near the respective four corners of the service area 70 to be able to receive radio signals from the terminal devices within the service area 70.

The access point 10 is connected to the internet 80 which is a wide area network (hereafter called WAN). The access point 10 is able to perform exchanging of information with other nodes connected to the internet 80 via this connection. By doing this, the terminal devices within vehicles parked within this service area 70 are connected to the internet 80 via the access point 10, making possible internet communication for performing exchanging of information with other nodes connected to the internet 80. As aspects of this internet communication, there are web contents acquisition, e-mail sending and receiving, internet telephoning, and the like.

Figure 2:
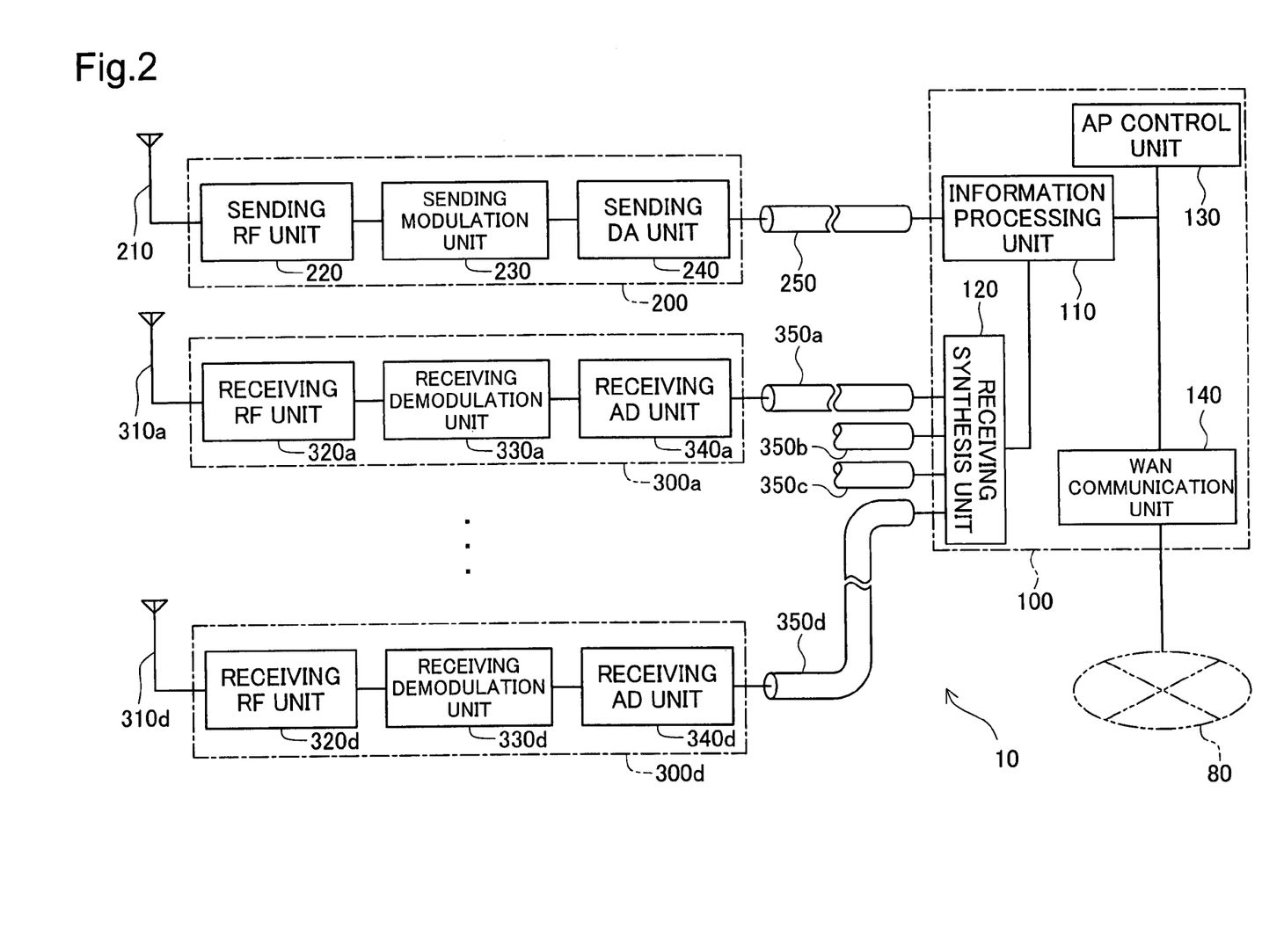
FIG. 2 is an explanatory diagram showing the internal hardware constitution of the access point 10 for the first embodiment.

Next, the hardware constitution inside the access point 10 for the first embodiment is described. FIG. 2 is an explanatory drawing showing the hardware constitution inside the access point for the first embodiment. First, the hardware constitution inside the main unit case 100 is described. Comprised in the main unit case 100 which constitutes the access point 10 are an information processing unit 110, a receiving synthesis unit 120, a WAN communication unit 140, and an AP control unit 130. The information processing unit 110 and the receiving synthesis unit 120 are electrically connected. Transfer of received digital signals to the information processing unit 110 is performed via this connection. The AP control unit 130 is connected to make possible exchanging of information between the information processing unit 110 and the WAN communication unit 140. By doing this, the information processing unit 110 and the WAN communication unit 140 are able to perform mutual exchanging of information via the AP control 130. By doing this information exchange, it is possible to do communication via the internet, and thus to realize information exchange.

The information processing unit 110 is also called a media access controller (hereafter called MAC), and this is constituted by a one chip microcomputer comprising a CPU, ROM, RAM, various types of communication interfaces, and the like. This information processing unit 110 executes processing of digital signals which are information exchanged by wireless LAN communication based on a communication protocol compliant with the IEEE 802.11b (or 11g) standard. The receiving synthesis unit 120 is constituted by a one chip microcomputer comprising a CPU, ROM, RAM, various types of communication interfaces, and the like. This receiving synthesis unit 120 performs diversity receiving by appropriately doing selective synthesis of an independent plurality of received signals. By doing this, it is possible to reduce the phasing variation and to suppress degradation of received signal quality. The WAN communication unit 140 is constituted by a one chip micro computer comprising a CPU, ROM, RAM, various types of communication interfaces, and the like, and performs communication with the internet 80. The AP control unit 130 is constituted by a CPU, ROM, RAM, various types of communication interfaces and the like, and performs various types of control on the access point 10.

Next, the hardware constitution within the sending antenna case 200 is described. As shown in FIG. 2, the sending antenna case 200 that constitutes the access point 10 comprises a sending antenna 210, a sending RF unit 220, a sending modulation unit 230, and a sending DA unit 240. The sending DA unit 240 is connected to the information processing unit 110 comprised in the main unit case 100 via a coaxial cable 250. Furthermore, from upstream of the sent signal flow, there is an electrical connection in the sequence of the sending DA unit 240, the sending modulation unit 230, the sending RF unit 220, and the sending antenna 210. Digital signals are output from the information processing unit 110 to the sending DA unit 240. The sending DA unit 240 converts the received digital signals to analog signals, and outputs these as base band signals to the sending modulation unit 230. The sending modulation unit 230 modulates these base band signals using carrier waves, and these are output as intermediate frequency (hereafter called IF) signals to the sending RF unit 220. The sending RF unit 220 finally converts these to RF signals, and outputs them to the sending antenna 210. Note that though omitted from the figure, each part of the sending antenna case 200 receives various types of control signals from the information processing unit 110 via the coaxial cable 250 and receives supply of power from the main unit case 100.

The sending DA unit 240 is constituted from a microcomputer that is also called a base band processor. This sending DA unit 240 does D/A conversion of sent digital signals sent via the coaxial cable 250 from the information processing unit 110, and converts these to base band signals for sending which are analog signals. The sending modulation unit 230 is constituted as a one chip processor comprising various types of mixers, amps, filters, and the like for sending. This sending modulation unit 230 modulates base band signals for sending that were converted by the sending DA unit 240, and converts them to sent IF signals. The sending RF unit 220 is a one chip processor comprising various types of mixers, amps, filters, and the like for sending, and converts the sent IF signals converted by the sending modulation unit 230 to sent RF signals. The sending antenna 210 is a sleeve type non-directional antenna comprising various types of amps, filters, and the like. This sending antenna 210 emits the sent RF signals converted by the sending RF unit 220 into space. By doing this, the access point 10 is able to send wireless LAN communication information to the terminal devices within the service area 70.

Next, the hardware constitution inside the receiving antenna case 300a is described. As shown in FIG. 2, comprised in the receiving antenna case 300a that constitutes the access point 10 are a receiving antenna 310a, a receiving RF unit 320a, a receiving demodulation unit 330a, and a receiving AD unit 340a. From upstream of the received signal flow, there is an electrical connection in the sequence of the receiving antenna 310a, the receiving RF unit 320a, the receiving demodulation 330a, and the receiving AD unit 340a. Furthermore, the receiving AD unit 340a is connected to the receiving synthesis unit 120 comprised in the main unit case 100 via the coaxial cable 350a. The RF signals received by the receiving antenna 310a are output from the receiving antenna 310a to the receiving RF unit 320a. The IF signals for which RF signals were converted are output from the receiving RF unit 320a to the receiving demodulation unit 330a. At the receiving demodulation 330a, detection demodulation is performed, and the base band signals are output to the receiving AD unit 340a. The receiving AD unit 340a converts these to digital signals and outputs them to the receiving synthesis unit 120. Note that the same as with the sending antenna case 210, though omitted from the illustration, various types of control signals are sent to each part of the receiving antenna case 300a from the receiving synthesis unit 120 via the coaxial cable 350a, and supply of power is also performed from the main unit case 100.

The receiving antenna 310a is a flat diversity antenna comprising various types of amps, filters, and the like. This receiving antenna 310a captures the wireless LAN communication radio waves in space and fetches them as received RF signals. The receiving RF unit 320a is a one chip processor comprising various types of mixers, amps, filters and the like for receiving. This receiving RF unit 320a converts the received RF signals fetched by the receiving antenna 310a to received IF signals in anticipation of detection demodulation. The receiving demodulation unit 330a is a one chip processor comprising various types of mixers, amps, and filters for receiving. This receiving demodulation unit 330a demodulates the received IF signals received from the receiving RF unit 320a, and outputs these as base band signals for receiving. The receiving AD unit 340a is a micro computer also called a base band processor. This receiving AD unit 340a does A/D conversion of the base band signals for receiving fetched from the receiving demodulation unit 330a, and outputs these as received digital signals. These received digital signals are sent to the receiving synthesis unit 120 via the coaxial cable 350a. By doing this, the access point 10 is able to receive wireless LAN communication information from the terminal devices within the service area 70.

The other receiving antenna cases 300b, 300c, and 300d of the access point 10 comprise the same constitution as the receiving antenna case 300a, so with FIG. 2, part of the illustration has been omitted. It is also possible to receive wireless LAN communication information via these receiving antenna cases 300b, 300c, and 300d. Therefore, the receiving synthesis unit 120 is able to receive received digital signals from the coaxial cables 350a, 350b, 350c, and 350d. At this time, the data of the field intensity of the original RF signals for converting to the received digital signals is received together. The receiving synthesis unit 120 selects the received digital signals with the highest field intensity based on this data, and outputs the selected signals as wireless LAN communication received signals to the information processing unit 110.

According to the access point 10 of the first embodiment described above, the exchange of signals is performed via the coaxial cables 250, 350a, 350b, 350c, and 350d between the main unit case 100, the sending antenna case 200, and the receiving antenna cases 300a, 300b, 300c, and 300d using the digital transmission method. With this embodiment, the maximum distance is 100 meters from the main unit case 100 to the sending antenna case 200 or the receiving antenna cases 300a to 300d, but since the digital method is used for data exchange between these, it is possible to increase the S/N ratio for sending and receiving, making it possible to greatly reduce the sending and receiving error rate. Therefore, it was possible to greatly reduce the data sending and receiving error rate between the access point 10 and the terminal devices. Finally, the access point 10 internally processes digital signals based on IEEE 802.11b (or 11g), and with this embodiment, these internal digital signals based on IEEE 802.11b (or 11g) undergo power amplification, but for signal carrying, remain as is using transmission via the coaxial cables 250, 350a, 350b, 350c, and 350d. As a result, it is not necessary to separately provide hardware for performing conversion between analog signals and digital signals, or the like. Therefore, it is possible to increase the communication quality of wireless LAN communication while trying to suppress increased complexity of the device constitution or to suppress manufacturing costs.

In addition to the transmission of wireless LAN communication digital signals, the coaxial cables 250, 350a, 350b, 350c, and 350d are also used for transmission of various types of control signals from the information processing unit 110 and for supplying power from the main unit case 100 side. Therefore, it is possible to connect between the device main unit and the antenna unit with one set of wired cables. Also, it is not necessary to separately supply power to the sending antenna case 200 and the receiving antenna cases 300a, 300b, 300c, and 300d. As a result, it is possible try to make the access point installation work and maintenance work easier.

Also, because the coaxial cables 250, 350a, 350b, 350c, and 350d are relatively strong against noise, it is possible to make the distance between the device main unit and the antenna unit big at a scale of 100 meters. Also, since it is inexpensive compared to optical cable, it is also possible to suppress the manufacturing costs.

Figure 3:
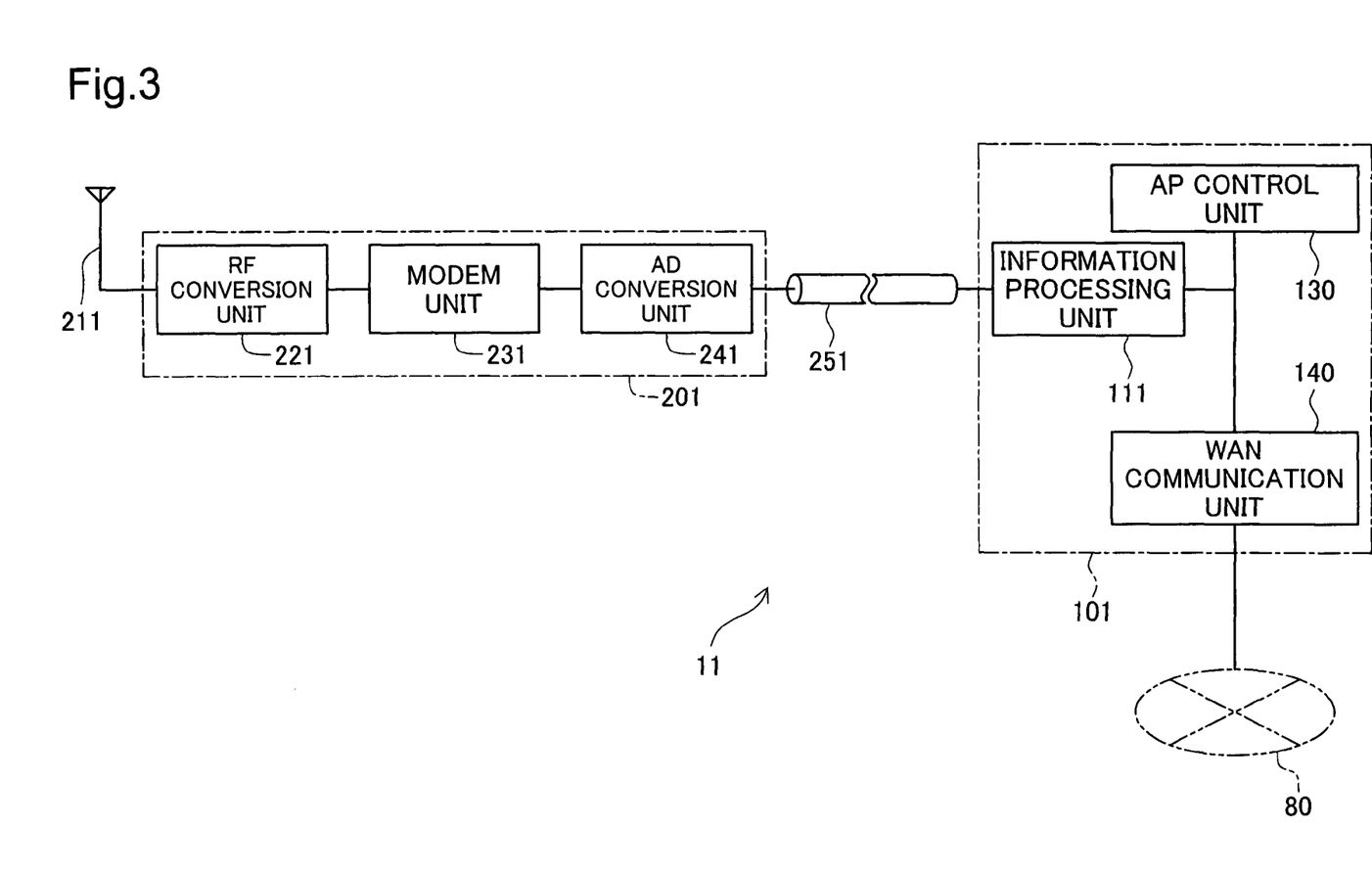
FIG. 3 is an explanatory diagram showing the internal hardware constitution of an access point 11 for the second embodiment.

Next, the access point 11 of the second embodiment of the invention is described. The access point 11 of the second embodiment differs from the access point 10 of the first embodiment in that it performs sending and receiving of wireless LAN communication radio signals with a single antenna. A typical illustration is shown in FIG. 3 of the hardware constitution within the access point 11 for this second embodiment. As shown in the figure, the access point 11 comprises a main unit case 101 for housing devices mainly for performing information processing for wireless LAN communication and the like, and an antenna case 201 for housing devices for handling sent signals for wireless LAN communication and the like. The main unit case 101 and the antenna case 201 are connected by a coaxial cable 251. The main unit case 101 is installed in the control tower 75, the same as with the first embodiment. The antenna case 201 is installed near the center of the service area 70 so as to be able to send and receive radio signals with the terminal devices within the service area 70. The coaxial cable 251 is installed in a form with most of it buried underground. Note that it is also acceptable to have a plurality of the antenna cases 201 provided with these connected with the main unit case 101 using a plurality of coaxial cables the same as with the first embodiment.

Next, the hardware constitution within the access point 11 of the second embodiment is described. First, the hardware constitution within the main unit case 101 is described. The access point 11 comprises in the main unit case 101 the information processing unit 111, the WAN communication unit 140, and the AP control unit 130. For the hardware constitution within the main unit case 101, the information processing unit 111 differs from the first embodiment only in that the received digital signals are directly received from the coaxial cable 251.

Next, the hardware constitution within the antenna case 201 is described. The access point 11 comprises in the antenna case 201 the antenna 211, the RF conversion unit 221, the modem unit 231, and the AD conversion unit 241. From upstream of the received signal flow, the electrical connection is made in the sequence of the antenna 211, RF conversion unit 221, modem unit 231, and AD conversion unit 241. Furthermore, the AD conversion unit 241 is connected with the information processing unit 111 comprised in the main unit case 101 via the coaxial cable 251. RF signals are exchanged between the antenna 211 and the RF conversion unit 221. The IF signals are exchanged between the RF conversion unit 221 and the modem unit 231. Base band signals are exchanged between the modem unit 231 and the AD conversion unit 241. Digital signals are exchanged between the AD conversion unit 241 and the information processing unit 111. Besides this, each part of the antenna case 201 receives various types of control signals from the information processing unit 111 and receives supply of power from the main unit case 101 via the coaxial cable 251.

The antenna 211 is a sleeve type non-directional antenna comprising various types of amps, filters, and switches for switching radio wave sending and receiving and the like. This antenna 211 performs sending and receiving of wireless LAN communication radio signals. The RF conversion unit 221 is a one chip processor comprising various types of mixers, amps, filters and the like. This RF conversion unit 221 performs conversion between RF signals and IF signals. The modem unit 231 is a one chip processor comprising various types of mixers, amps, filters and the like. This modem unit 231 performs conversion between IF signals and base band signals. The AD conversion unit 241 is constituted by a micro computer also called a base band processor. This AD conversion unit 241 performs A/D conversion and D/A conversion, and performs conversion between base band and digital signals. The AD conversion unit 241 performs exchanging of digital signals with the information processing unit 111 via the coaxial cable 251. This digital signal exchange is performed using a half duplex communication method for switching between sending and receiving. By doing this, it is possible to perform exchanging of information via the wireless LAN between the access point 11 and the terminal devices within the service area 70.

According to the access point 11 of the second embodiment described above, in addition to exhibiting the operating effect as that of the first embodiment, because sending and receiving of radio signals is performed with a single antenna, it is possible to further simplify the overall constitution.

Above, embodiments of the invention were described, but the invention is not limited in any way to these kinds of embodiments, and it is of course possible to implement various aspects within a scope that does not stray from the key points of the invention. For example, transmission of digital signals with wired cable may also be applied regardless of whether this is serial transmission or parallel transmission. Also, the wired cable is not limited to coaxial cable, but may also be equilibrium shaped cable or the like. Also, the cable length is not limited to approximately 100 meters, but may also be a length of approximately 1 meter, or may exceed 100 meters. Also, the wireless LAN provided by the access point may be not wireless LAN communication compliant with the IEEE 802.11b standard of 11g standard, but rather another wireless LAN communication such as IEEE 802.11a or another wireless communication.

INDUSTRIAL APPLICABILITY

The invention may be used for a wireless LAN access point either indoors or outdoors. Also, the location for providing the wireless LAN is not limited to a service area such as of a freeway or the like, but may also be an amusement park, shopping mall, a sports stadium, an event site, an educational institution such as a university, a factory, an office, or the like.

What is claimed is:

1. An access point providing a wireless local area network operable to connect a terminal device to a wide area network, the access point comprising:
   (a) an information processing unit operable to process a digital signal based on a communication protocol for communicating via the wireless local area network;
   (b) a sending antenna case that includes: (i) a sending antenna and (ii) a sending signal conversion unit, without a function for receiving a radio frequency signal from the terminal device, wherein the sending signal conversion unit is operable to convert a digital signal from the information processing unit to a radio frequency signal for the wireless local area network, and the sending antenna is operable to send the converted radio frequency signal to the terminal device;
   (c) a plurality of receiving antenna cases spaced apart from the sending antenna case in a service area around the sending antenna case, wherein each one of the plurality of receiving antenna cases includes: (iii) a receiving antenna and (iv) a receiving signal conversion unit, without a function for sending a radio frequency signal to the terminal device, wherein each one of the receiving antennas is operable to receive a radio frequency signal from the terminal device when the terminal device is located between the sending antenna case and the receiving antenna case, and wherein the receiving signal conversion unit is operable to convert the radio frequency signal received from the terminal device to a digital signal for the information processing unit;
   (d) a main unit case that is separated from the sending antenna case and the plurality of receiving antenna cases, and includes the information processing unit and a receiving synthesis unit, wherein the receiving synthesis unit is operable to perform diversity receiving with respect to the received radio frequency signals from the plurality of receiving antennas;
   (e) a sending wire cable that connects the main unit case to the sending antenna case to transmit the digital signal from the information processing unit to the sending signal conversion unit; and
   (f) a plurality of receiving wire cables operable to transmit the digital signal from the plurality of receiving signal conversion units to the receiving synthesis unit, wherein each one of the plurality of receiving wire cables connects a respective one of the plurality of receiving antenna cases to the main unit case.

2. An access point according to claim 1, wherein the signal conversion unit comprises:
   a frequency conversion unit that performs conversion between the radio frequency signal and an intermediate frequency signal having lower frequency than the radio frequency signal;
   a modem unit that performs modulation and/or demodulation between the intermediate frequency signal and a base band signal; and
   a base band unit that performs conversion between the base band signal and the digital signal.

3. An access point according to claim 1, wherein the transmission of the digital signal by the wired cable is either one of serial transmission and parallel transmission.

4. An access point according to claim 1, wherein the wired cable, in addition to transmission of the digital signal, performs at least one of transmission of a control signal and power supply, for at least one of the antenna unit and the signal conversion unit.

5. An access point according to claim 1, wherein the wired cable is coaxial cable.

6. A method for exchanging signals at an access point operable to provide a wireless local area network connection to a terminal device, for connecting the terminal device to a wide area network, the method comprising:
   disposing an information processing unit in a main unit case, wherein the information processing unit is operable to process a digital signal based on a communication protocol used by the wireless local area network;
   disposing a sending antenna case that includes a sending antenna and a sending signal conversion unit, without a function for receiving a radio frequency signal from the terminal device, wherein the sending signal conversion unit is operable to convert a digital signal from the information processing unit to a radio frequency signal for the wireless local area network, and the sending antenna is operable to send the converted radio frequency signal to the terminal device;
   (c) disposing a plurality of receiving antenna cases spaced apart from the sending antenna case in a service area around the sending antenna case, wherein each one of the plurality of receiving antenna cases includes: (i) a receiving antenna and (ii) a receiving signal conversion unit, without a function for sending a radio frequency signal to the terminal device, wherein each one of the receiving antennas is operable to receive a radio frequency signal from the terminal device when the terminal device is located between the sending antenna case and the receiving antenna case; and wherein the receiving signal conversion unit is operable to convert the radio frequency signal received from the terminal device to a digital signal for the information processing unit;
   (d) disposing a main unit case that is separated from the sending antenna case and the plurality of receiving antenna cases, and includes the information processing unit and a receiving synthesis unit, wherein the receiving synthesis unit is operable to perform diversity receiving with respect to the received radio frequency signals from the plurality of receiving antennas;

connecting the main unit case and the sending antenna case via a sending wired cable, connecting the main unit and each of the plurality of receiving antenna cases via a plurality of receiving wired cables, wherein a receiving synthesis unit in the main unit case is connected to each one of the plurality of receiving antennas by a respective separate receiving wired cable; and transmitting the digital signal according to the protocol of the local area network via the wired cable.

7. An access point operable to effectively provide a wireless local network operable to connect a terminal device to a wide area network, the access point comprising:

a main unit case that includes an information processing unit operable to process a digital signal based on a communication protocol for communicating with the terminal device;

a sending antenna case separated from the main unit case, wherein the sending antenna unit case, without a function for receiving a radio frequency signal from the terminal device, the sending antenna unit case includes a sending signal conversion unit and a sending antenna unit, wherein the sending signal conversion unit is operable to convert the digital signal from the information processing unit into a converted radio frequency signal for exchanging information via the wireless local area network, and wherein the sending antenna unit is operable to send the converted radio frequency to the terminal device;

a plurality of receiving antenna cases spaced apart from the sending antenna case in a service area around the sending antenna case and separated from the main unit case, wherein each of the plurality of receiving antenna cases is without a function for sending a radio frequency signal to the terminal device and each receiving antenna case includes a receiving antenna unit and a receiving conversion unit, wherein the receiving antenna unit operable to receive a radio frequency signal from the terminal device, and wherein the receiving conversion unit operable to convert the radio frequency signal received by the receiving antenna unit into a digital signal for transmitting to the information processing unit;

a sending wired cable that connects the main unit case to the sending antenna case to transmit the digital signal from the information processing unit to the sending signal conversion unit;

a plurality of receiving wired cables operable to transmit: the digital signal from each one of the plurality of receiving antenna cases to the main unit case wherein each one of the plurality of receiving wire cables connects one of the plurality of the receiving antenna cases to the main unit case; and wherein the information processing unit includes a receiving synthesis unit that performs diversity receiving with respect to the radio frequency signal received at the plurality of receiving antenna cases.

* * * * *